United States Patent [19]

Harada

[11] Patent Number: 4,737,909
[45] Date of Patent: Apr. 12, 1988

[54] CACHE MEMORY ADDRESS APPARATUS

[75] Inventor: Edward Harada, Sunnyvale, Calif.

[73] Assignee: National Semiconductor Corp., Santa Clara, Calif.

[21] Appl. No.: 718,578

[22] Filed: Apr. 1, 1985

[51] Int. Cl.$^4$ ................. G06F 12/08; G06F 12/10
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 4,136,385 | 1/1979 | Gannon et al. | 364/200 |
| 4,170,039 | 10/1979 | Beacon et al. | 364/200 |
| 4,228,504 | 10/1980 | Lewis et al. | 364/200 |
| 4,290,104 | 9/1981 | Holtey et al. | 364/200 |
| 4,322,815 | 3/1982 | Brougton | 364/900 |
| 4,363,095 | 12/1982 | Woods et al. | 364/200 |
| 4,400,774 | 8/1983 | Toy | 364/200 |
| 4,453,230 | 6/1984 | Mizoguchi et al. | 364/900 |
| 4,456,954 | 6/1984 | Bullions, II et al. | 364/200 |
| 4,464,712 | 8/1984 | Fletcher | 364/200 |
| 4,464,717 | 8/1984 | Keeley et al. | 364/200 |
| 4,473,878 | 9/1984 | Zolnowsky et al. | 364/200 |
| 4,638,426 | 1/1987 | Chang et al. | 364/200 |
| 4,654,777 | 3/1987 | Nakamura | 364/200 |
| 4,654,790 | 3/1987 | Woffinden | 364/200 |
| 4,658,356 | 4/1987 | Shiozaki et al. | 364/200 |

OTHER PUBLICATIONS

"NS16082 Memory Management Unit (MMU)", National Semiconductor Corp. publication, Mar. 1982.

Primary Examiner—Gareth D. Shaw
Assistant Examiner—Viet Q. Nguyen
Attorney, Agent, or Firm—Limbach, Limbach & Sutton

[57] ABSTRACT

In a processor system with a virtual memory organization and a cache memory table storing the physical addresses corresponding to the most-recently used virtual addresses, access to the cache table is enhanced by associating upper and lower MSB portions of a virtual address with corresponding upper and lower portions of an associated cache address. The separate cache address portions are placed in separate cache address storage devices. Each cache address storage device is addressed by respective virtual address MSB portions. A physical address storage device stores physical addresses translated from virtual addresses in storage locations addressed by cache addresses associated with the respective virtual addresses from which the physical addresses were translated.

7 Claims, 3 Drawing Sheets

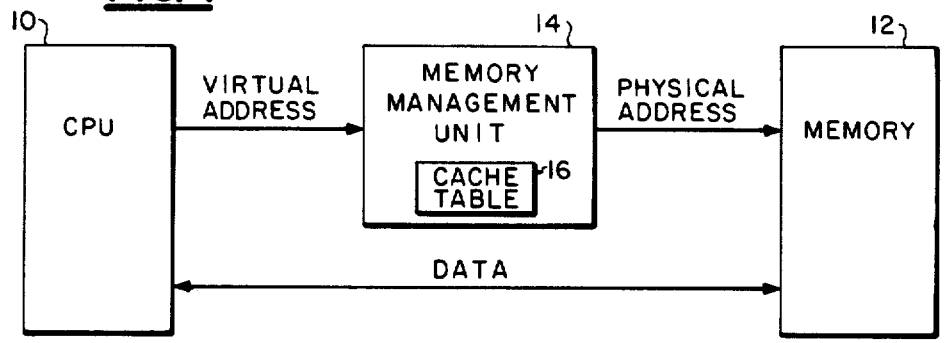
FIG. 1
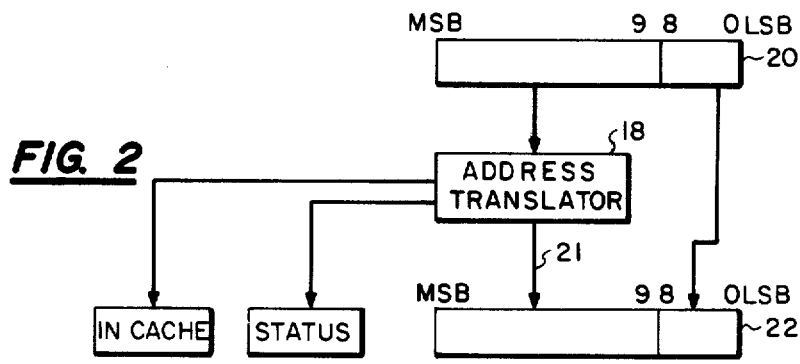
FIG. 2
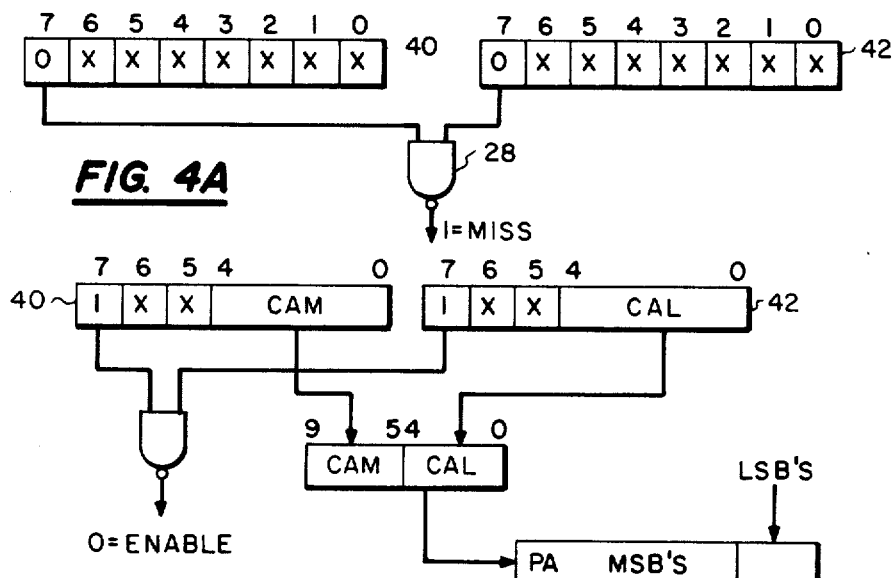
FIG. 4A
FIG. 4B

CACHE MEMORY ADDRESS APPARATUS

BACKGROUND OF THE INVENTION

This invention pertains to data processing systems employing virtual memory organizations, and more specifically to the organization and operation of cache tables in such systems.

The cost of memory hardware practically limits the amount of semiconductor memory that can be used in a processor system. However, users are demanding broader capabilities from their systems than can be practically and economically supported by a reasonable amount of semiconductor memory. In order to expand its memory capability, a system can be provided with a virtual memory using secondary storage devices, such as electromagnetic disks or tapes, as an adjunct to the semiconductor memory.

The requirement for efficient utilization of a virtual memory system has led to the development of virtual addressing in which a virtual address defining the map of the entire memory system is subject to address translation that converts the virtual address into a physical address corresponding to a location in the main memory.

As is known, a virtual memory organization is transparent to the system user who writes programs for a processing system as though all sectors of the virtual memory space are equally accessible. However, the operating program of a virtual memory processing system manipulates the virtual address supplied by the user to shift data between the main semiconductor memory and the secondary memory so that currently-accessed memory segments are stored into the main memory when needed, and returned to the secondary memory when not needed. Conventionally, this process involves translation of the virtual address to the physical address, with the physical address identifying main memory storage space wherein the currently-used memory segments are stored.

In order to increase the speed with which address translation takes place, a memory address cache is often used. The cache can comprise a table associating the most recently accessed virtual addresses and their translated physical addresses. Thus, when a virtual address is produced by the central processing unit (CPU) of the processing system, a memory management unit (MMU) will first attempt to match the virtual address with an entry in the cache table. If the produced virtual address is contained in the cache table, the address translation is complete and the main memory location can be immediately accessed.

The cache table is normally constructed as a lookup table whose contents are the most recently-used physical addresses, each of which is stored together with a plurality of status or control bits. As is known, the status or control bits can be used to monitor, among other things, the frequency with which a physical address is referenced and whether or not data at the referenced main memory location indicated by the physical address has been modified.

A cache memory can take any one of several well-known general forms such as directly-, associatively-, set associatively-, or sector-mapped. See *Computer Architecture* and *Parallel Processing*, K. Hwang Et Al, McGraw-Hill, 1984. These representative cache memory organizations all require a two-level cache structure: the first level contains the virtual-to-physical memory address translation, while the second confirms that the desired memory sector indicated by the physical memory is actually in the main memory storage. This requires two lookup table operations and two levels of circuitry to implement them.

A simplified cache address table would reduce the total number of lookup table operations and the amount of circuitry.

It is therefore the principal object of the present invention to provide a cache address table affording a simplified lookup operation.

It is a further object of the present invention to reduce the hardware requirements for such a cache address table.

SUMMARY OF THE INVENTION

The present invention simplifies the cache address table lookup operation by implementing a lookup table associating the most recently accessed virtual memory addresses with their corresponding physical memory addresses in a single lookup table implemented by three random access memory devices (RAM's).

The invention concerns a cache memory address apparatus for use in a processing system producing virtual memory addresses, cache memory addresses corresponding to respective virtual memory addresses, and physical memory addresses translated from corresponding virtual memory addresses.

The apparatus of the invention includes a cache address storage unit having plural addressable locations, each for storing the upper most significant bit (MSB) portion of a cache memory address at a storage location that is addressed by the upper MSB portion of a virtual memory address to which the cache memory address corresponds and for storing the lower MSB portion of the cache memory address at another storage location that is addressed by the lower MSB portion of the correspondent virtual memory address.

An enabling gate responsive to data stored in the cache address storage unit provides a miss signal when one storage location of the cache address storage unit addressed by a portion of a virtual memory address does not contain a corresponding cache memory address portion. The gate further provides an enabling signal when each cache address storage unit location addressed by a virtual memory address contains a corresponding stored cache memory portion.

Finally, the cache memory address apparatus includes a physical address RAM having plural addressable storage locations for storing physical memory addresses at locations addressed by cache memory addresses when the enabling gate provides the enabling signal.

Other objects, features and advantages of the present invention will become apparent and be appreciated by reference to the detailed description of the invention provided below considered in conjunction with the accompanying drawings.

BRIEF DESCRIPTION OF THE DRAWINGS

FIG. 1 is a block diagram illustrating a portion of a processing system, including a cache memory table.

FIG. 2 is a block diagram illustrating how virtual memory addresses produced by a processing system are converted to physical addresses by an address translator.

FIGS. 4A and 4B are schematic diagrams illustrating how flag data entered into the apparatus of the invention enable the apparatus to access a stored physical address.

DETAILED DESCRIPTION OF THE PREFERRED EMBODIMENT

Figure 3:
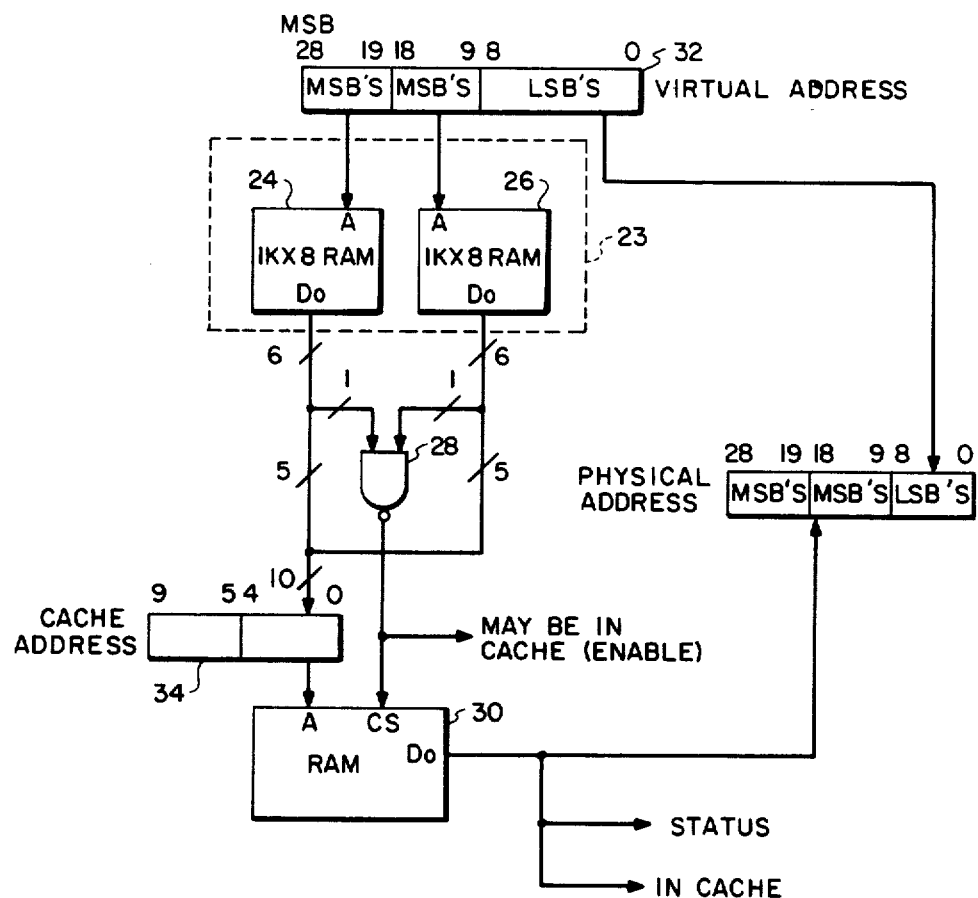
FIG. 3 is a block diagram illustrating a cache memory address apparatus in accordance with the present invention and schematic figures of address signals that illustrate the operation of the apparatus.

A conventional processing system can embrace a number of basic equipments including a programmable central processing unit (CPU), a main semiconductor memory, a memory management unit (MMU) and programmable capability in the MMU for performing address translation on virtual memory addresses provided by the CPU. Such components are known in the art. For example, a microprocessor, including a high performance CPU and a memory management unit, are available from National Semiconductor Corporation under the product designations NS32032 and NS16082, respectively. Devices suitable for assembling a main semiconductor memory are generally available in the form of random access memories (RAM's) of varying storage capacity.

The general interconnection of such units is illustrated in FIGS. 1 and 2 where a CPU 10 is connected to a memory 12 by way of an MMU 14 containing a cache table 16. During its operation, the CPU 10 will provide virtual memory addresses to the MMU 14 which translates them, by well-known methods, into other addresses. One result of address translation is a physical memory address which accesses storage space in the memory 12.

The process of address translation is speeded up by the provision of a cache table in the MMU. As is known, the cache table 16 can be used to hold a predetermined number of virtual memory addresses which have been most recently provided to the MMU 14. Associated with the virtual addresses are their translated physical addresses. Thus, when the CPU 10 provides a virtual address to the MMU 14, the MMU 14 first attempts to match the virtual address entry in the cache table 16 associated with a previously-translated physical address.

If the current virtual address does not have an associated physical address contained in the cache table 16, the MMU 14 obtains a physical address by the address translation operation represented in FIG. 2. Typically, an MMU will have a combination of circuitry and programming forming an address translator 18. The translator 18 has the capacity of translating all virtual addresses into corresponding physical addresses by a common formula or mapping function. The translation is usually performed upon predetermined most significant bits (MSB's) of the virtual address to produce corresponding MSB's of the physical address. This process is illustrated in FIG. 2 where a virtual address 20 having least significant bits (LSB's) 0–8 and MSB's MSB-9 is presented to the MMU 14. Address translation is performed by the translator 18 operating on the virtual address MSB's to produce the MSB's of the physical address 22. As is typical, the LSB's of the virtual address will be carried over without translation to form the LSB's of the physical address.

Translation of the virtual address is accompanied by provision of overhead bits (shown in FIG. 2 as being obtained from the address translator 18) which are used by the MMU to manage the cache. One bit is called the "in cache" bit; other bits, called "status bits", are used to implement to cache management policy of the MMU.

The overhead bits are stored in the cache table together with the physical address so that, when the physical address is retrieved from the table, it is accompanied by the overhead bits stored with it.

The operation of the cache memory address apparatus of the present invention which can assist the process of address translation by functioning as a novel cache memory table is illustrated in FIG. 3. In FIG. 3, a cache address memory storage device 23 includes a pair of conventional RAM's 24 and 26. Each of the RAM's 24 and 26 contains 1024 (1K) addressable storage locations, each location having the capacity of storing 8 bits of information; thus the designation 1K×8 for each RAM. In the preferred embodiment, only six of the eight available bit positions in each storage location of the RAM's 24 and 26 are used, with one bit from each RAM being provided to the input of a NAND gate 28 and the other five combining to form a 10-bit address which is fed to the address (A) port of a 1K×20 RAM 30. The RAM 30 is enabled to output data stored at a location indicated by the address input at the A port when an ENABLE signal from the NAND gate 28 is fed to the chip select (CS) port of the RAM 30.

In operation, the upper ten MSB's of a virtual address 32 are fed to the A port of the RAM 24 and the lower ten MSB's of the virtual address 32 are fed to the address A port of the RAM 26. If the virtual address 32 is one that has recently been provided by the CPU 10, a 10-bit cache address 34 will have been stored in the RAM's 24 and 26, with the MSB's, bits 5–9, of the cache address stored at the location in the RAM 24 addressed by the upper MSB's of the virtual address 32 and the cache address LSB's, bits 0–4, in the location in RAM 26 addressed by lower MSB's of the virtual address 32. In practice, the cache address can be provided by a cache address translation, not shown, that can be implemented using well-known methods in an MMU such as the MMU 14.

In addition, when bits 5–9 of the cache address 34 are stored at the RAM storage location addressed by MSB's 19–28 of the virtual address 32, one of the remaining three bits is set. This function can also be conventionally implemented in an MMU such as MMU 14. Likewise, when the LSB's of the cache address 34 are stored in the RAM storage location addressed by the upper MSB's of the virtual address 32, one of the three remaining bits is set. It is the two set bits which are provided to the NAND gate 28 that cause its output to go low and to produce the ENABLE signal for the RAM 30. When the output of the NAND gate 28 goes low, data residing at the storage location in the RAM 30 addressed by the cache address 34 is output from the data output ($D_o$) port of the RAM 30. If the "in cache" bit output by the RAM 30 is set, the 20 address bits stored at the addressed location will provide the 20 MSB's (bits 28–9) of the physical address 36, with the LSB's of the physical address being taken from the corresponding LSB's of the virtual address 32 as described above.

In FIG. 4A, the data format 40 represents each of the addressable storage spaces in the RAM 24 when the FIG. 3 cache memory address apparatus is set to an initial state, as when the processing system it forms a part of is initially turned on or reset. Similarly, the data format 42 represents the initial setting of each of the addressable storage locations in the RAM 26. At the start of operation, the bit in bit position 7 of each of the data formats 40 and 42 is set to zero. Both of these bit positions are the data outputs which are sampled by the NAND gate 28 each time the RAM's 24 and 26 are addressed. Thus, whenever the RAM location addressed by one of the two MSB portions of a virtual address has had no data written to it, the gate 28 will provide a 1, indicating that the current virtual address has had no cache address assigned to it. The 1 output by the gate 28 in these circumstances can also form a conventional MISS signal that will cause the MMU 14 to undertake appropriate operations, described below, necessary to make a cache entry for the current virtual address.

As illustrated in FIG. 4B, when a virtual address is assigned a cache address, the cache address, comprising ten bits, will be split as described above between the RAM 24 and RAM 26, with the five bits in the RAM 24 designated the cache address MSB's (CAM) and the lower five bits the cache address LSB's (CAL). When the MSB's and LSB's of a cache address are entered into the respective RAM's, each will be entered into bits 0–4 of the 8-bit space addressable by the corresponding MSB's of the virtual address to which the cache address is assigned. At the same time that the CAM's and CAL's are entered, bit 7 in each of their respective storage locations is set. Then, when the same virtual address occurs after the entry of the cache address portions into the RAM's, the set seventh bits will cause the output of the gate 28 to go low, enabling the RAM 30 to output the data stored at its storage location addressed by the cache address comprising the upper and lower cache address portions currently output. If the physical address translated from the current virtual address has been stored at the location accessed by the cache address, the physical address MSB's will be output by the RAM 30 together with the "in cache" and status bits stored with it.

A typical example of how the cache memory address apparatus of FIG. 3 is to be used in a system embracing the elements of FIG. 1 will now be described. When the system is initially turned on, or after it is reset, the following data pattern will be written into all locations of the RAM's 24 and 26 to indicate that the cache is empty: 0xxx xxxx, where 0 indicates a bit is reset, and x indicates a "don't care" state.

When the CPU 12 provides a virtual memory address, the upper and lower MSB groups described above are provided to the RAM's 24 and 26, respectively. Assume, for example, that the first virtual address provided is:

(0000 0000 00) UM (00 0000 0000) LM (x—x)LSB's where UM indicates (upper) MSB's 28–19 and LM, (lower) MSB's 18–9. The output of both of the RAM's 24 and 26 is 0xxx xxxx, since the system was just initialized. Therefore the output of the gate 28 will be high, indicating that the virtual address sector represented by its 20 most significant bits has no corresponding entries in the cache. At this time, an MMU such as MMU 14 will select a cache address of 10 bits to correspond to the virtual address, for example, 0000 0000 00, and will write 1xx0 0000 into the RAM 24 at address 0000 0000 00 (corresponding to MSB's 28–19 of the first virtual address). Likewise, 1xx0 0000 will be entered into the RAM 26 at address 0000 0000 00 (corresponding to MSB's 18–9 of the first virtual address).

Now, the cache address 0 0000 0 0000 goes to the RAM 30, the RAM is enabled in a typical fashion to have data written to it; and the physical address translated from the first virtual address is entered, together with the "in cache" and status bits, at the location accessed by the cache address 0 0000 0 0000 output by the RAM's 24 and 26. As is known, the capacity of the RAM 30 can be expanded to store at each addressable location status bits corresponding to information such as "location has been accessed", "location has been written to", "process number", "write protect", "read protect", and so on according to the needs of the preferred memory management policy.

Assume now that on the next process cycle the same memory location is accessed and the first virtual memory address is again provided to the MMU 14. Now, when the upper MSB's 0000 0000 00 are provided to the RAM 24, and the lower MSB's 0000 0000 00 to the RAM 26, the output of gate 28 will be low, corresponding to the ENABLE signal, and cache address 0 0000 0 0000 will be provided to the RAM 30 where the physical address (PA) MSB's and status bits will be provided as an output.

Assume now that on the third memory access, a different memory location is indicated. For example, the following virtual address might be provided:

(0000 1000 00) UM (0000 0010)LM (x—x)LSB's

When the virtual address MSB groups are presented to their respective RAM's, bit 7 of the accessed location in each RAM will contain a 0, causing the gate 28 to provide the MISS signal, indicating that the virtual address has no corresponding entry in the cache. Then the MMU will assign, for example, the cache address 0 0001 00001 to the current virtual address and enter 1xx0 0001 into the RAM 24 at address location 0000 1000 00 and into the RAM 26 at 0000 0000 0010. Now, the cache address 0 0001 00001 is provided to the RAM 30 where the translated physical address of the current virtual address is written together with the appropriate overhead bits.

This process can proceed until the RAM 30 is full. At this time a replacement algorithm will have to be employed to replace one of the physical addresses stored in the RAM 30. Many algorithms are available to accomplish this, the "least recently used" (LRU) replacement algorithm being one example. When one of the physical addresses is to be replaced in the RAM 30, its corresponding virtual address is provided to the RAM's 24 and 26 where 0xxx xxxx is written to the address locations in those RAM's. Then, the current virtual address is provided to the RAM's 24 and 26 and the cache address of the removed physical address is assigned to the current virtual address and entered as described above into the locations and RAM's 24 and 26 accessed by the current virtual memory. At the same time that the cache address is reassigned to the current virtual address, bit number 7 in the addressed locations in the RAM's 24 and 26 is set. Then, the physical address translated from the current virtual address is entered with the required overhead bits into the location in the RAM 30 accessed by the reassigned cache address.

It should be evident that a virtual address whose translated physical address has not yet been entered into the RAM 30 can nevertheless stimulate the production of an ENABLE signal from the gate 28. This can occur when, for example, the upper MSB's of the current virtual address have occurred in one recent preceding virtual address, while the lower MSB's are the same as the lower MSB's in a different recently preceding virtual address. When this occurs, both of the MSB sectors will access a pair of filled cache memory address storage locations, each of which has a 1 in bit position 7 resulting from the two preceding virtual addresses. Then, the RAM 30 will be enabled and may provide data that is not equivalent to the physical address translated from the current virtual address. In this case the "in cache" bit indicates whether the correct physical address is or is not in cache. In the preferred embodiment, the "in cache" bit being set indicates the physical address is in cache. Thus, if the bit is true, the MMU will treat the data at the addressed location as the MSB's of the correct physical address; if false, the entry of the physical address MSB's will be made and the bit set.

In keeping with conventional memory management nomenclature, a high output from the gate 28 can be used as a typical MISS signal, indicating that a physical address is not in cache. Similarly, the "in cache" bit, if set, can be used as a HIT signal, to show the presence of a physical address in cache.

The HIT and MISS signals are used by the MMU 14 to take the appropriate steps to enter the currently-translated physical address into the RAM 30 when appropriate. The HIT/MISS signal can also be used to forward the physical address signal stored in the RAM 30 to other circuitry, not shown, for memory access or exchange procedures.

Figure 5:
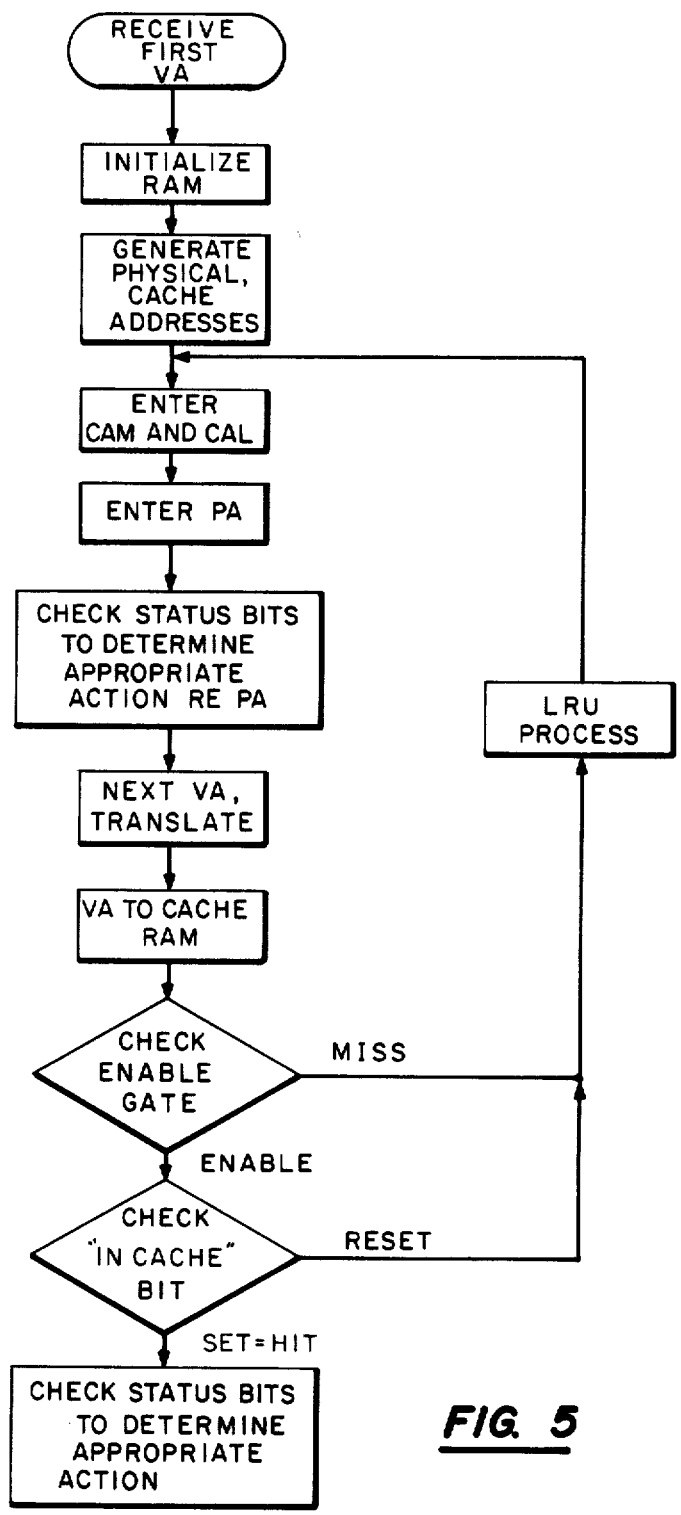
FIG. 5 is a flow diagram illustrating how the memory management unit of FIG. 1 controls the operation of the apparatus of the invention.

The MMU 14 can be conventionally configured by means of a programmable controller, to control the cache memory address apparatus of the invention by means of a procedure illustrated in FIG. 5. Thus, when the MMU 14 and cache memory address apparatus are first turned on or reset, the RAM's 24, 26 and 30 are initialized and the first virtual address is sent to the MMU 14. When the first virtual address is received, the MMU 14 translates the physical address and obtains a cache address, for example, from a cache address table. Next, the cache address MSB and LSB portions, CAM and CAL, are entered into the RAM's 24 and 26 at the memory address locations determined by the upper and lower MSB's of the virtual address as described above. Then, with CAM and CAL entered, and bit 7 of both locations set, the gate 28 selects the RAM 30 and the MMU 14 can enter the physical address through a conventional write cycle at the address location in the RAM 30 determined by the cache memory address resulting from a combination of the MSB and LSB cache address portions available from the RAM's 24 and 26.

During the first tour through the FIG. 5 procedure, the MMU 14 can check the overhead bits stored with the physical address entered into the RAM 30. Initially a check of the status bits would be a validity check since no history of prior activity will have affected them.

After the initial virtual address has set up the apparatus of the invention, the next virtual address is translated by the MMU 14 and the virtual address MSB's are sent to the RAM's 24 and 26. Now, the MMU 14 will monitor the output from the gate 28 to determine whether a cache address has been assigned to the current virtual address. It should be evident that if the output of the gate 28 is high, then, as explained above, a cache memory portion has not been stored at either or both of the locations addressed by the virtual address MSB's. In this event, a MISS will be interpreted, the MMU 14 will undertake a procedure for assigning a cache address and storing a physical address in the RAM 30, if need be, by a least recently used (LRU) algorithm to replace a previously-stored physical address.

In the event that the gate 28 enables the RAM 30, the MMU 14 will inspect the "in cache" bit at the addressed location of the RAM to determine whether the current virtual address has its translated physical address stored in the RAM 30. In the event that the "in cache" bit is set, indicating that the addressed physical address in the RAM 30 is equivalent to the translated physical address, the MMU 14 will update the status bits of the stored with the physical address, without changing the address MSB's, and then wait for the next virtual address.

In the event that the "in cache" bit is reset, the MMU 14 again undertakes to store the currently-translated physical address at an appropriate location in the RAM 30. Under these circumstances, if all of the storage locations in the RAM 30 are filled, the LRU process will be employed to select the least recently used physical address, appropriating the cache memory address where the least recently used physical address is stored as the cache memory address to be associated with the current virtual address. The current virtual address will then be assigned the appropriated cache memory address by means of the storage procedure for the RAM's 24 and 26 described above. In addition, the currently-translated physical address will be stored, together with its overhead bits, in the RAM 30 at the location addressed by the appropriated cache memory address.

Obviously, many modifications and variations of the present invention are possible in light of the above teachings. It is therefore to be understood that within the scope of the appended claims the invention may be practiced otherwise than as specifically described.

I claim:

1. A cache memory address apparatus for use in a processing system producing virtual addresses, cache addresses corresponding to respective virtual addresses, and physical addresses translated from said virtual addresses, said apparatus comprising:

cache address storage means for storing a first portion of a cache address at a first cache address storage location that is addressed by a first portion of a virtual address to which said cache address corresponds and for storing a second portion of said cache address at a second cache address storage location that is addressed by a second portion of said virtual address;

gate means responsive to information stored in said cache address storage locations for providing a miss signal when either one of said cache address storage locations addressed by said virtual address does not contain a corresponding cache address portion which corresponds to said portion of said virtual address and for providing an enabling signal when said first and second cache address storage locations addressed by said virtual address contain first and second cache address portions which correspond, respectively, to said first and second portions of said virtual address; and physical address storage means having a plurality of addressable storage locations for storing physical address portions at locations addressed by cache addresses formed from cache address portions stored in said cache address storage means and for providing, in response to said enabling signal, a physical address portion stored at a location addressed by said cache address.

2. The apparatus of claim 1 wherein said cache address storage means includes a pair of RAM's each addressed by a respective portion of said virtual address.

3. The apparatus of claim 1 wherein each cache address storage location includes storage capability for storing, in addition to a cache address portion, flag data indicating the presence of absence of a cache address portion in said cache address storage location.

4. The apparatus of claim 3 wherein said processing system further includes means for entering said flag data into a cache address storage location at a predetermined place in said storage location.

5. The apparatus of claim 4 wherein said gate means comprises a NAND gate connected to receive flag data from both cache address storage locations addressed by said virtual address.

6. The apparatus of claim 2 wherein said processing system includes means for entering, for said virtual address, each of the first and second portions of said corresponding cache address into a respective one of said RAM's at a cache address storage location addressed by said first and second portions, respectively, of said virtual address and for entering, at said first and second cache address storage locations, flag data indicating whether said first and second portions of said corresponding cache address have been entered, and said gate means is responsive to said flag data in said first and second cache address storage locations to provide said miss or said enabling signal.

7. A method for storing physical addresses in a system producing virtual addresses, cache addresses corresponding to respective virtual addresses, and physical addresses translated from said virtual addresses, comprising the steps of:

storing, for a virtual address, first and second portions of a corresponding cache address at first and second cache address storage location, respectively, addressed by first and second portions, respectively, of said virtual address;

entering, at said first and second cache address storage location, flag data indicating said storage;

determining based upon the presence or absence of flag data, whether said first and second cache address storage locations addressed by said first and second portions of said virtual address contain first and second cache address portions;

storing, at a physical address storage location addressed by said stored cache address, a physical address portion translated form said virtual address; and if said first and second cache address storage location addressed by said portions of said virtual address are determined to contain first and second cache address portions, retrieving the physical address portion stored at said physical address location.

* * * * *